(12) United States Patent
Damm et al.

(10) Patent No.: US 7,779,884 B2
(45) Date of Patent: Aug. 24, 2010

(54) MULTI-LEVEL LAMINATING PRESS

(75) Inventors: Norbert Damm, Karlsdorf-Neuthard (DE); Dagmar Metzger, Karlsruhe (DE)

(73) Assignee: Robert Burkle GmbH, Freudenstadt (DE)

( * ) Notice: Subject to any disclaimer, the term of this patent is extended or adjusted under 35 U.S.C. 154(b) by 254 days.

(21) Appl. No.: 12/113,555

(22) Filed: May 1, 2008

(65) Prior Publication Data

US 2008/0295967 A1 Dec. 4, 2008

(30) Foreign Application Priority Data

May 30, 2007 (DE) .................. 10 2007 025 380

(51) Int. Cl.
*B32B 37/00* (2006.01)

(52) U.S. Cl. .............. 156/583.3; 156/382; 34/611; 100/307

(58) Field of Classification Search ......... 156/382, 156/583.3; 34/611; 100/307
See application file for complete search history.

(56) References Cited

U.S. PATENT DOCUMENTS 3,896,559 A 7/1975 Martin 5,605,547 A * 2/1997 Lake .................. 29/25.01
5,875,710 A * 3/1999 Honda et al. .......... 100/196
6,367,530 B1 * 4/2002 Shimotomai .......... 156/382

FOREIGN PATENT DOCUMENTS

| DE | 1660090 | 3/1971 |
| DE | 69727746 | 12/2004 |
| EP | 1609597 | 12/2005 |
| JP | 2004238196 A * | 8/2004 |
| WO | 2006128699 | 12/2006 |

* cited by examiner

*Primary Examiner*—Khanh Nguyen
*Assistant Examiner*—John Blades
(74) *Attorney, Agent, or Firm*—Volpe and Koenig, P.C.

(57) ABSTRACT

A multi-layer laminating press including hot plates arranged over top of and movable in reference to each other, conveyers revolving around the hot plates, sealing elements that assist in forming vacuum chambers between each of a first hot plate and a respectively adjacent second hot plate arranged thereabove when the press is closed. The second conveyor lower run of the second hot plate rests on the first conveyor upper run of the first hot plate and the work piece to be laminated is arranged between the first conveyor upper run and the second conveyor lower run in the vacuum chamber. Connections are provided to pressurize and/or evacuate the vacuum chambers. The vacuum chambers are limited by either the first hot plate and the second conveyor lower run, or the second hot plate and the first conveyor upper run, without the interposition of another membrane for laminating the workpiece.

10 Claims, 2 Drawing Sheets

MULTI-LEVEL LAMINATING PRESS

CROSS-REFERENCE TO RELATED APPLICATIONS

This application claims the benefit of DE 102007025380.1. filed May 30, 2007, which is incorporated by reference herein as if fully set forth.

BACKGROUND

The invention relates to a multi-level laminating press to laminate essentially planar work pieces under the influence of pressure and heat, particularly photo-voltaic modules.

Accordingly, a multi-level laminating press of the present type comprises a number of hot plates arranged over top of each other and movable in reference to each other, with all the hot plates usually being moved simultaneously or in groups in order to open and close the press. If necessary, the hot plates can also be moved individually in order to open and close individual press chambers. Further, a multi-level laminating press of the present type comprises a number of conveyers with one upper run and one lower run each revolving around the hot plates. The work pieces are then inserted into the press by the traveling motion of the conveyers, supported on the upper run, and again removed therefrom.

A multi-layer laminating press of the present type also comprises sealing elements to form vacuum chambers in each space between a first hot plate and the respective second hot plate arranged adjacently thereabove when the press is closed, with the sealing elements being arranged between the hot plates and the conveyers. This means that either separate sealing elements are provided, or the conveyers themselves seal the hot plates. In a closed press the lower run of the second conveyer of the second hot plate is supported on the upper run of the first conveyer of the first hot plate, while the work piece to be laminated is arranged between the upper run of the first conveyer and the lower run of the second conveyer inside the vacuum chamber. The vacuum chamber may be evacuated and/or pressurized.

Laminating presses to laminate particularly photo-voltaic modules are known, for example, from WO 2006/128699 A2. An upper part with a sealing frame is arranged above the hot plate, with said sealing frame outlining a vacuum chamber, which can be evacuated when the press is closed by a tight contact of the sealing frame to the hot plate. A membrane is stretched over the sealing frame sealing the vacuum chamber and serving as a compression means in order to apply the pressure against the hot plate necessary to laminate the work piece. For this purpose, in a closed press the vacuum located under the membrane between it and the hot plate is evacuated causing the membrane to closely contact the work piece. If necessary, the pressure chamber, formed by sealing the sealing frame in reference to the upper press plate and limited towards the bottom by the membrane, is pressurized with compressed air. Particularly when laminating photo-voltaic modules it is very advantageous to operate with such membranes, because the modules usually exhibit an uneven surface. Additionally, it is of the utmost importance that the lamination occurs free of bubbles and no leaks develop through which moisture could enter the photo-voltaic modules.

In order to laminate photo-voltaic modules usually very strong adhesives are used. Therefore, it is common in prior art to protect the membrane by a separating film placed between the membrane and the work piece, because adhesive remnants on the membrane, which may render it useless or at least worsen its operation, can only be removed from the membrane using considerable efforts which are hard to justify.

Particularly in photo-voltaic modules having their yield of electric energy directly depending on their area, the processing capacity per surface area directly influences the cost efficiency for temporarily limited processes such as laminating. Accordingly it is advantageous to provide a multi-layer laminating press, in which several pressing layers are arranged over top of each other. In this way, the area capacity to be processed is increased without increasing the space necessary at the production site.

A multi-layer laminating press with individual layers of the above-described type is described in EP 1 609 597 A2. However, this fails to sufficiently solve the problem of the membranes sticking together; because separating films must be manually placed onto the work pieces to prevent this from occurring. Of course, this renders the process slower and more expensive, compromising the advantages of the multi-layer press.

SUMMARY

The present invention is based on the objective of facilitating a multi-layer laminating press of the type mentioned at the outset and accordingly to increase the efficiency of the process and to reduce the construction expense.

This object is attained in a multi-layer laminating press having the features according to the invention. Preferred further developments and embodiments of the multi-layer laminating process according to the invention are described in detail below.

According to the present invention, the membrane that was previously considered a mandatory compression means in a laminating press of the present type is omitted. Instead, the vacuum chambers are limited, on the one hand, by the first hot plate and, on the other hand, by the lower run of the second conveyer, or, on the one hand, the second hot plate and, on the other hand, the upper run of the first conveyer. Thus, membranes stretched in a sealing frame are no longer used as compression means, which become compressed against the work piece by a vacuum and/or pressurization and which presses it either to the lower or the upper hot plate of a press level, but its function is additionally executed by the revolving conveyers. Due to the fact that the conveyers are embodied in a revolving fashion a cleaning thereof from outside the press levels is easily possible so that additionally a separating film can be waived.

It is even possible to retrofit a conventional multi-layer press into a multi-layer laminating press according to the present invention by retrofitting the sealing elements, particularly the sealing frames to form vacuum chambers, namely of course directly at least at one hot plate so that the allocated conveyer extends over the sealing elements and thus both conveyers travel through the vacuum chamber formed by adjacent hot plates.

The hot plates are here preferably provided with recesses and/or indentations, so that the sealing elements not necessarily require the shape of a frame, however sufficient volume remains in the vacuum chambers. Depending on the embodiment of the invention it is beneficial if either the upper hot plate is provided at its bottom with a recess, or the lower hot plate at its upper side, or both hot plates of a press layers show recesses. Within the scope of the present invention the contour of the vacuum chambers as well as perhaps pressure chambers may therefore be embodied in the upper sides and/or the lower sides of the hot plates, including the necessary seals, unless the conveyers themselves provide sealing functions towards the environment of the chambers in the hot plates. Alternatively or additionally, off-set sealing frames are also possible in order to form vacuum chambers and their seals and perhaps form additional pressure chambers.

Particular advantages result when the upper runs of the conveyer have different material features than the lower runs, because the upper runs of the conveyers serve to support transportation of the work pieces to be laminated, while the lower runs only serve to complete the conveyers and do not directly serve to transport the work pieces, at least when the conveyers execute one entire revolution around the hot plate for transporting the work pieces in and out. Accordingly, the lower runs may be embodied softer or more elastic and thus optimized in their function as pressure means for the lamination according to the invention. Here, it must be mentioned that it has surprisingly shown that the highly elastic membranes used as membrane presses are less effective compression means for work pieces, such as photo-voltaic modules, than the conveyer used according to the invention. Since the highly-elastic membranes contact the work pieces very closely, including largely at their edges, which is particularly desired in furniture production, it results in the edge regions of the work pieces being subject to higher pressures, which particularly in photo-voltaic modules may lead to breakage of glass or fractures at the edges of the solar cells.

When the conveyers, as mentioned above, comprise two parts with different material features these two parts are preferably fastened to each other by at least two separable connectors, for example conveyer links. The simple ability to separate this conveyer connector not only ensures a simple production of this special conveyer but also allows the exchange of a part of the conveyer, if necessary, without simultaneously having to replace the other part.

The revolving conveyers of the multi-layer laminating press according to the invention can be provided with tensile elements stretching the conveyers around the hot plates when traveling. They may represent piston-cylinder units, for example, which allow the deflection rolls at the face of the hot plate to move towards the hot plate and away therefrom in order to consequently stretch and relax the conveyer traveling over the deflection roll. Within the scope of the present invention it is then preferred to stretch the conveyers revolving around the hot plates, while they are relaxed during the closure of the press. The relaxation of the conveyers once more optimizes their functions as compression means when laminating the work pieces.

In order to allow that the production chamber per se between the upper run of the first conveyer and the lower run of the second run of the second conveyer of a press level can be evacuated via at least one of the two hot plates involved it is beneficial for either the bottom run of the second conveyer or the upper run of the first conveyer not to cover the sealing elements over their entire surface so that air can be suctioned off laterally at the respective conveyer and/or is provided with suction openings, for example a perforation, to allow air to be suctioned off through the respective conveyer. If processing occurs not only via a vacuum chamber but pressurization of the compression means is used as well, it is necessary that the respectively other conveyer of a press level covers the vacuum chamber over its entire surface and particularly contacts the sealing elements so that a gas-tight pressure chamber is formed.

When conveyers of the multi-level laminating press according to the invention comprises two different parts, an entire revolution of the conveyers is necessary for inserting and removing the work pieces, i.e. half an empty drive between removing and inserting work pieces. However, even when the conveyers are embodied conventionally such a complete revolution around the hot plate is advantageous, due to on the one hand, the thermal conditions, and on the other hand, the chance to clean the conveyers during traveling and here particularly the one of the lower run, which according to the invention forms the compression means during lamination. This can occur, for example, by a cleaning device, particularly arranged at a face of a hot plate and which is moved past the conveyer when revolving around the hot plate. Of course, both faces of a hot plate may be provided with such cleaning devices, with perhaps each hot plate being provided with its own cleaning devices or the cleaning devices being allocated to several hot plates.

BRIEF DESCRIPTION OF THE DRAWINGS

In the following, an exemplary embodiment of the present invention is described and explained in greater detail. Shown are.

DETAILED DESCRIPTION OF THE PREFERRED EMBODIMENTS

Figure 1:
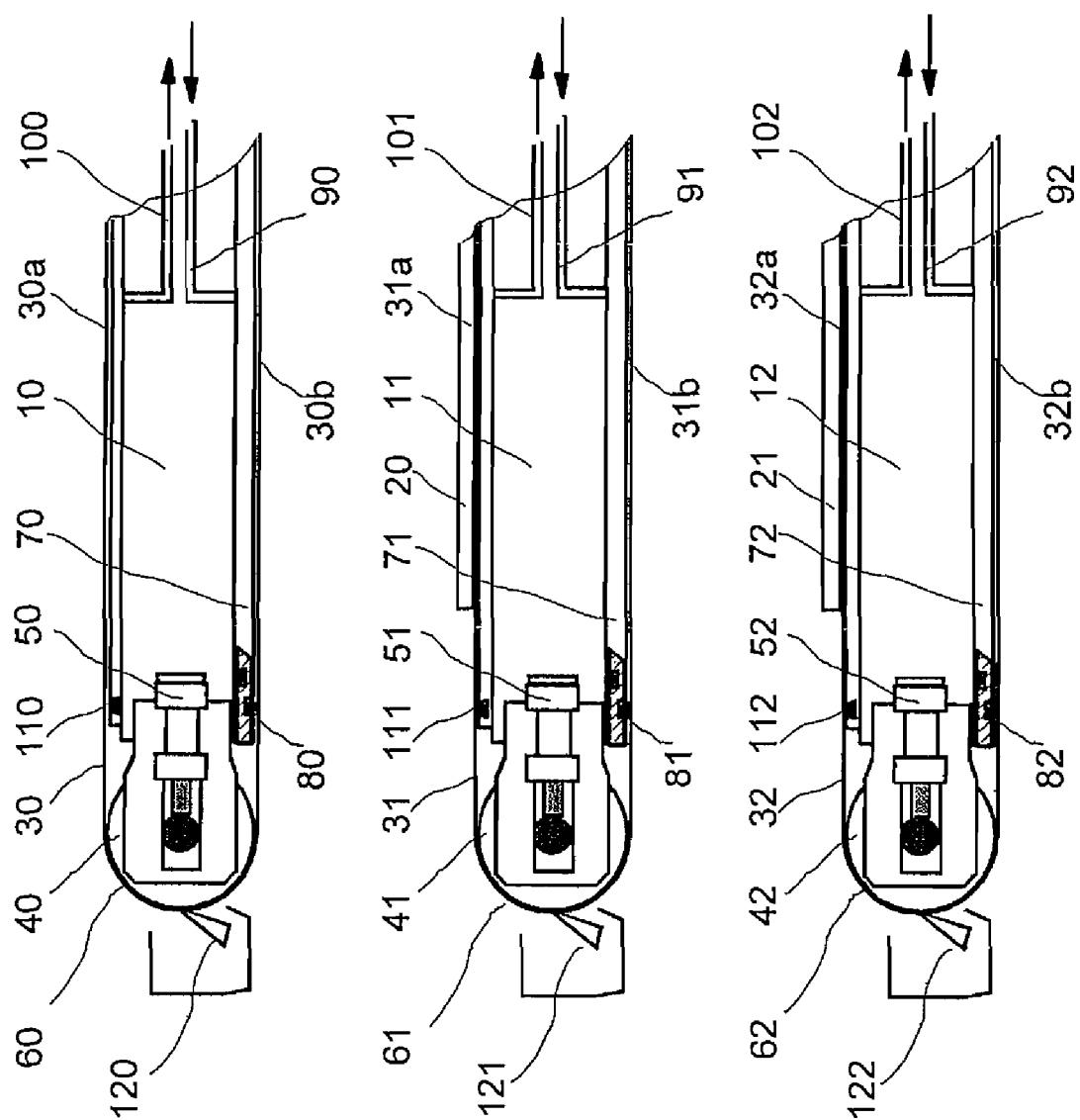
FIG. 1 is a schematic partial side view of an open multi-layer laminating press.

FIG. 1 shows a schematic partial side view of three hot plates 10, 11, and 12 of a multi-layer laminating press with a multitude of hot plates. The three hot plates 10, 11, 12 shown form two press levels between each other, in which a work piece 20, 21 each is located to be laminated.

One conveyer 30, 31, 32 each revolves around each of the hot plates 10, 11, 12, namely around the deflection rolls 40, 41, 42, each of which is mounted via a piston-cylinder unit 50, 51, 52 to the faces of the hot plates 10, 11, 12 and which can relax when the conveyers 30, 31, 32 approach these faces and vice versa. The conveyers 30, 31, 32 each comprise one upper run 30a, 31a, 32a embodied as a conveyer and a lower run 30b, 31b, 32b, embodied more elastic and wider in reference thereto, with the two parts being connected to each other via two detachable conveyer connectors 60, 61, 62 (only one of them visible in this illustration, of course).

The upper sides of the hot plates 10, 11, 12 are embodied planar in the exemplary embodiment shown here and are provided with only symbolically illustrated suction openings 100, 101, 102, in order to allow the evacuation of the product space between the upper run 31a of a first conveyer 31 and the lower run 30b of a second conveyer 30. For this purpose the upper run 31a of the first conveyer 31 (as well as the other upper runs 30a, 32a) is embodied narrower than the lower runs 30b, 31b, 32b, so that an evacuation of the production space above the suction openings 100, 101, 102 is possible through the hot plates 10, 11, 12. Accordingly, the upper sides of the hot plates 10, 11, 12 are additionally provided with sealing frames 110, 111, 112 so that below the lower runs 30b, 31b, 32b and limited by them, gas-tight vacuum chambers are formed. By evacuating these vacuum chambers the lower run 30b, 31b tightly contacts the work pieces 20, 21 and press them against the hot plates 11, 12, which simultaneously prevent the formation of bubbles during the lamination process.

In order to form pressure chambers, recesses 70, 71, 72 are provided at the bottom sides of the hot plates 10, 11, 12, and sealing frames 80, 81, 82 are placed thereon. In this way, a cooperation with the bottom run 30b, 31b, 32b of the conveyers 30, 31, 32 forms one pressure chamber each, via which symbolically illustrated pressure lines 90, 91, 92 are impinged with compressed air. The lower runs 30b, 31b, 32b of the conveyers are kept comparatively wide, so that they cover the sealing frames 80, 81, 82 on all sides.

Figure 2:
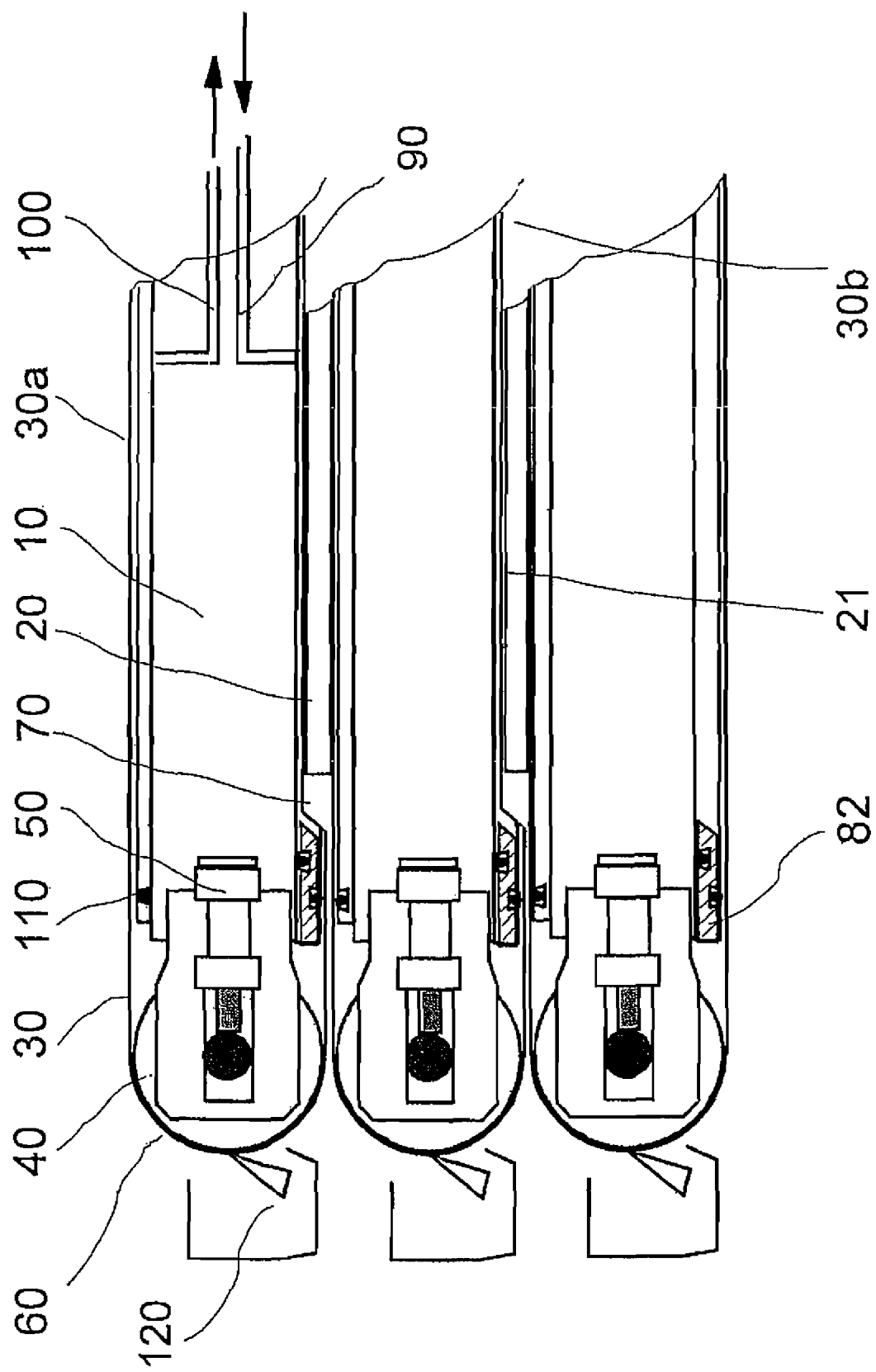
FIG. 2 is a schematic partial side view of a closed multi-layer laminating press.

FIG. 2 is a representation similar to FIG. 1, however with the multi-layer laminating press being closed. As illustrated in this drawing, the lower runs 30b, 31b, 32b of the conveyers 30, 31, 32 contact the upper runs 30a, 31a, 32a of the respectively adjacent conveyers and/or the work pieces 20, 21, placed therebetween when the multi-layer laminating press is closed. Simultaneously, the sealing elements 80, 81, 82, and 110, 111, 112 with the conveyers 30, 31, 32 positioned therebetween seal all around in order to form a vacuum chamber and a pressure chamber. These chambers are divided in a gas-tight fashion by the lower runs 30b, 31b, 32b of the conveyers, so that the upper half of the chambers can be impinged with compressed gas after the lower half of the chambers has been evacuated. The Teflon-coated, low-elastic, thin lower run 30b of a conveyer 30 therefore accepts the function of a compression means during the lamination of a work piece 20 instead of an extremely elastic membrane, which is omitted according to the invention.

One cleaning device 120, 121, 122 each is provided at the deflection rollers 40, 41, 42 of each conveyer 30, 31, 32, for example a rotating cleaning brush or a doctor, as shown here. When removing the work pieces 20, 21 after the lamination process and after the opening the multi-layer laminating press, the lower runs 30b, 31b, 32b of the conveyers 30, 31, 32 travel past the cleaning devices 120, 121, 122 and are here cleaned of any potentially remaining adhesives. When the work pieces 20, 21 are removed the lower runs 30b, 31b, 32b each contact the upper side of the hot plates 10, 11, 12 so that another half revolution of the conveyers 30, 31, 32 is necessary as an empty drive to allow the insertion of additional work pieces. Here, the upper runs 30a, 31a, 32a of the conveyers 30, 31, 32 then pass the cleaning devices 120, 121, 122 so that they too are cleared of any remaining adhesives. Thus, additional separating films are unnecessary.

The invention claimed is:

1. A multi-layer laminating press for laminating essentially planar work pieces (20, 21) using pressure and heat, comprising:
    a plurality of press levels having hot plates (10, 11, 12) arranged over top of each other and movable in reference to each other;
    a plurality of conveyers (30, 31, 32) revolving around the hot plates (10, 11, 12) each of the conveyors having one upper run (30a, 31a, 32a) and one lower run (30b, 31b, 32b);
    sealing elements (80, 81, 82, 110, 111, 112) arranged between the hot plates (10, 11, 12) and the conveyers (30, 31, 32) to form a first vacuum chamber between a first hot plate (11) and a respectively adjacent second hot plate (10) arranged thereabove in a closed position of the press, and the lower run (30b) of the second conveyer (30) of the second hot plate (10) rests on the upper run (31a) of the first conveyer (31) of the first hot plate (11) and the work piece (20) to be laminated is arranged between the upper run (31a) of the first conveyer (31) and the lower run (30b) of the second conveyer (30) inside the first vacuum chamber; and
    means (90, 91, 92, 100, 101, 102) to at least one of pressurize or evacuate the first vacuum chamber, and
    wherein the first vacuum chamber is limited by either the first hot plate (11) and the lower run (30b) of the second conveyer (30) or the second hot plate (10) and the upper run (31a) of the first conveyer (31), without the interposition of another membrane as the compression means for laminating the workpiece.

2. A multi-layer laminating press according to claim 1, wherein the hot plates (10, 11, 12) are provided with recesses (70, 71, 72) to form at least one of vacuum chambers or pressure chambers.

3. A multi-layer laminating press according to claim 1, wherein the upper runs (30a, 31a, 32a) of the conveyers (30, 31, 32) have different material features than the lower runs (30b, 31b, 32b).

4. A multi-layer laminating press according to claim 1, wherein the upper runs (30a, 31a, 32a) of the conveyers (30, 31, 32) have different geometric dimensions with respect to at least one of a thickness or width than the lower runs (30b, 31b, 32b).

5. A multi-layer laminating press according to claim 3, wherein the lower runs (30b, 31b, 32b) and the upper runs (30a, 31a, 32a) of the conveyers are fastened to each other via at least two detachable conveyer connectors (60, 61, 62).

6. A multi-layer laminating press according to claim 1, wherein the conveyers (30, 31, 32) are provided with tensile elements (40, 41, 42, 50, 51, 52) that stretch the conveyers (30, 31, 32) in a first position to revolve around the hot plates (10, 11, 12) and relax the conveyers (10, 11, 12) in the closed position of the press.

7. A multi-layer laminating press according to claim 1, wherein the sealing elements (80, 111) are not covered over their entire surface by the lower run (30b) of the second conveyer (30) or the upper run (31a) of the first conveyer (31) of each of the press levels.

8. A multi-layer laminating press according to claim 1, wherein the conveyers (30, 31, 32) to insert and remove the work pieces (20, 21) are adapted to perform an entire revolution around the hot plates (10, 11, 12).

9. A multi-layer laminating press according to claim 1, wherein at least one cleaning device (120, 121, 122) is provided, which the conveyers (30, 31, 32) pass when revolving around the hot plates (10, 11, 12).

10. A multi-layer laminating press according to claim 1, wherein the lower run (30b) of the second conveyer (30) or the upper run (31a) of the first conveyer (31) of each of the press levels are provided with suction openings.

* * * * *